(12) United States Patent
Serve

(10) Patent No.: US 6,601,560 B1
(45) Date of Patent: Aug. 5, 2003

(54) METHOD FOR STARTING AND OPERATING AN INTERNAL COMBUSTION ENGINE

(75) Inventor: J. Vincent Serve, Springfield, OH (US)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 09/535,397

(22) Filed: Mar. 27, 2000

(51) Int. Cl.$^7$ ................................................ F02B 19/10
(52) U.S. Cl. ...................... 123/260; 123/261; 123/267; 123/277; 123/27 GE; 123/526
(58) Field of Search .................................. 123/260, 261, 123/267, 268, 275, 277, 27 GE, 526, 575

(56) References Cited

U.S. PATENT DOCUMENTS

| | | | |
|---|---|---|---|
| 4,091,772 A | * | 5/1978 | Heater et al. ............. 123/27 GE |
| 4,127,095 A | | 11/1978 | Noguchi et al. ........... 123/30 D |
| 4,306,526 A | | 12/1981 | Schaub et al. ............... 123/257 |
| 4,463,734 A | | 8/1984 | Akeroyd ..................... 123/525 |
| 4,524,730 A | | 6/1985 | Doell et al. ............... 123/27 GE |
| 4,527,516 A | | 7/1985 | Foster ..................... 123/27 GE |
| 4,603,674 A | | 8/1986 | Tanaka ......................... 123/575 |
| 4,966,103 A | | 10/1990 | Schaub et al. ............... 123/276 |
| 5,050,550 A | * | 9/1991 | Gao ........................ 123/27 GE |
| 5,293,851 A | | 3/1994 | Schaub ........................ 123/259 |
| 5,887,566 A | * | 3/1999 | Glauber et al. ........... 123/27 GE |
| 5,947,076 A | | 9/1999 | Srinivasan et al. ......... 123/267 |
| 6,209,511 B1 | * | 4/2001 | Goto et al. .................. 123/267 |

* cited by examiner

*Primary Examiner*—Erick Solis
(74) *Attorney, Agent, or Firm*—Dykema Gossett PLLC

(57) ABSTRACT

A method is provided for operating an internal combustion engine comprising a combustion chamber defined by the inner wall of a cylinder, a cylinder head and the upper surface of a piston moveable longitudinally within the cylinder, the engine further comprising a pre-combustion chamber in communication with the combustion chamber. The method comprises supplying to the combustion chamber a first combustible mixture of a first hydrocarbon fuel and oxygen; supplying to the pre-combustion chamber a second combustible mixture of a second hydrocarbon fuel and oxygen, the second combustible mixture being auto-ignitable; and compressing the first and second combustible mixtures by moving the piston within the cylinder; wherein under operating conditions in which the aforementioned steps are insufficient to operate the engine and keep it running, the method further comprises the step of generating a spark to cause ignition of the compressed first combustible mixture in the combustion chamber. An internal combustion engine operable using this method is also provided. In addition, a cylinder head for the modification of existing engines to operate using this method is also provided. The method is particularly useful for starting the internal combustion engine, especially when cold.

17 Claims, 1 Drawing Sheet

METHOD FOR STARTING AND OPERATING AN INTERNAL COMBUSTION ENGINE

TECHNICAL FIELD OF THE INVENTION

The present invention relates to an improved method for operating an internal combustion engine, in particular to an improved method for starting an internal combustion engine, and to an internal combustion engine adapted to operate under such a method.

BACKGROUND OF THE INVENTION

Internal combustion engines find use in a wide range of applications. One particular application is the stationary internal combustion engine, used as a source of power at sites, such as oil well heads and drilling operations. It is in this application that internal combustion engines powered by gaseous hydrocarbons, in particular natural gas, have become prominent.

Typically, such engines operate using fuels, such as diesel, which are ignited under compressive conditions generated within the cylinders of the engine, or using fuels, such as gasoline or natural gas, which require the provision of an ignition source. Commonly, the source for the ignition in the latter type of engine is a spark generated in the combustion of the engine, most commonly by means of a spark plug. In order to improve the durability and rating of the spark-ignited engines, the so-called "pilot ignited" engines have been developed. In the pilot ignited engines, a small volume of a liquid fuel having a suitably high cetane number is injected directly into the combustion chamber. The volume of fuel so injected is typically about 5 percent of the total fuel volume. The pilot ignited engines have found acceptance in the industry as a result of the aforementioned improvements. In addition, these engines offer the ability to change the fuel composition during the running of the engine and to switch, for example, from natural gas to diesel operation, without modification or shutting down of the engine. These engines are referred to as "dual fuel" or "gas diesel" engines.

Examples of dual fuel engines are disclosed in U.S. Pat. Nos. 4,603,674, 4,463,734, and 4,527,516. In each of these documents, an internal combustion engine is disclosed, which can operate on a mixture of fuels introduced directly into the combustion chamber of the engines.

As a result of concerns regarding emissions from internal combustion engines, a system was developed, in which the engine is provided with a so-called "auto-ignition chamber" or "torch cell". In such an arrangement, the engine is provided with a pre-combustion chamber in communication with the combustion chamber of the engine. A combustible fuel mixture is introduced into the pre-combustion chamber and ignited therein. The thus ignited fuel mixture is then allowed to enter the combustion chamber, where it ignites the main fuel/air mixture. An engine of this configuration is able to operate using a lean fuel mixture, which in turn results in a reduction in the emissions from the engine. Examples of such engines are as follows.

U.S. Pat. No. 4,306,526 discloses an internal combustion engine and a method for its operation. The engine is a turbocharged, two cycle engine and is operated on a lean fuel/air mixture. A jet cell ignition device is provided to ensure uniform and complete combustion of the fuel mixture. U.S. Pat. No. 4,966,103 discloses a combustion system for an internal combustion engine. The engine is a dual fuel engine operating on a mixed gas-liquid fuel and comprises a torch cell comprising an auto-ignition chamber in which a fuel having a sufficiently high cetane rating is caused to ignite. This in turn ignites the charge of fuel and air in the main combustion chamber of the engine.

A number of other torch-ignition systems are also known. U.S. Pat. No. 4,127,095 discloses a torch-ignition internal combustion engine provided with a main and pre-combustion chamber, in communication with each other through a torch aperture. The electrodes of a spark plug are disposed within the pre-combustion chamber. During operation, a lean air-fuel mixture is introduced into the main combustion chamber, from where a portion enters the pre-combustion chamber under the action of the compression stroke of the engine. The combustible mixture in the pre-combustion chamber is ignited by the spark plug, the flames from which propagate through the torch aperture into the main combustion chamber and thereby act as an ignition source for the main portion of the fuel mixture.

A modified version of this torch-ignition system is disclosed in U.S. Pat. No. 5,947,076. This patent describes and internal combustion engine having a main combustion chamber and a pre-combustion chamber, as in U.S. Pat. No. 4,127,095. The pre-combustion chamber is again provided with a spark plug. However, in the embodiment of U.S. Pat. No. 5,947,076 the electrode of the spark plug is located within a further chamber, a so-called "plug combustion chamber", intended to protect the electrode of the spark plug from turbulence within the main and pre-combustion chambers.

U.S. Pat. No. 5,293,851 addresses the issue of providing an improved internal combustion engine, in particular engines operating with gas as a fuel. One issue that can arise with such engines is problems with starting the engine, in particular from cold. Typically, in order to improve the starting of the engine, it was known to add a certain amount of diesel fuel to the gas fuel during the start-up phase, until the engine could be run on gas alone. In order to reduce this problem, U.S. Pat. No. 5,293,851 provided the internal combustion engine with a torch cell having a pre-combustion chamber provided with a glow plug. In operation, a combustible fuel mixture, typically and air-gas mixture, is introduced into the main combustion chamber of the engine. During the compression stroke of the engine, a portion of the compressed mixture is forced into the pre-combustion chamber of the torch cell. At or about the same time, a liquid fuel, typically diesel, is injected directly into the pre-combustion chamber so as to contact the glow plug. The action of the glow plug is to ignite the liquid fuel, which in turn ignites the gaseous fuel within the pre-combustion chamber. The flame front leaves the pre-combustion chamber and enters the main combustion chamber and ignites the main fuel mixture. The engine of U.S. Pat. No. 5,293,851 is capable of operating under reduced compression ratios, in turn allowing it to accommodate fuels having a lower octane rating than can be accommodated by the higher compression ratios of the more conventional torch-ignited engines.

The engine of U.S. Pat. No. 5,293,851 has been found to work very well and provide a range of advantages. However, some difficulty has been encountered with the operation of the engine under certain conditions. In particular, it has been found that starting the engine can be troublesome, especially when the engine is cold. It has been found that the walls of the pre-combustion chamber, when cold, act as a sizeable heat sink and impair the combustion characteristics of the engine, leading to poor starting performance. In addition, it has been found that, under certain conditions, the glow plug can provide a source for pre-ignition of the air-fuel mixture.

This in turn leads to poor running characteristics of the engine and, if allowed to persist, can lead to extensive damage to the engine components.

Accordingly, there is a need for an internal combustion engine arrangement which provides all the advantages of the engine of U.S. Pat. No. 5,293,851, but which does not suffer from the aforementioned drawbacks.

SUMMARY OF THE INVENTION

Surprisingly, it has been found that the running problems of the engine of U.S. Pat. No. 5,293,851 are significantly improved if a spark ignition system is provided for the combustible fuel mixture in the main combustion chamber, in addition to the torch-cell ignition system. Under difficult running conditions, such as cold starting, the spark ignition is used to supplement the torch-cell ignition system and achieve efficient operation of the engine.

Accordingly, the present invention provides a method for operating an internal combustion engine, which engine comprises a combustion chamber defined by the inner wall of a cylinder, a cylinder head and the upper surface of a piston moveable longitudinally within the cylinder, the engine further comprising a pre-combustion chamber in communication with the combustion chamber, the method comprising:

(a) supplying to the combustion chamber a first hydrocarbon fuel and oxygen to form a first combustible mixture;

(b) supplying to the pre-combustion chamber a second hydrocarbon fuel and oxygen to form a second combustible mixture, the second combustible mixture being auto-ignitable; and (c) compressing the first and second combustible mixtures by moving the piston within the cylinder;

the method further comprising the step of:

(d) generating a spark to cause ignition of the compressed first combustible mixture in the combustion chamber.

As noted, the method of this invention is particularly well suited to the cold starting of the internal combustion engine. Accordingly, in a further aspect, the present invention provides a method for starting an internal combustion engine, which engine comprises a combustion chamber defined by the inner wall of a cylinder, a cylinder head and the upper surface of a piston moveable longitudinally within the cylinder, the engine further comprising a pre-combustion chamber in communication with the combustion chamber, the method comprising:

(a) supplying to the combustion chamber a first hydrocarbon fuel and oxygen to form a first combustible mixture;

(b) supplying to the pre-combustion chamber a second hydrocarbon fuel and oxygen to form a second combustible mixture, the second combustible mixture being auto-ignitable;

(c) compressing the first and second combustible mixtures by moving the piston within the cylinder; and (d) generating a spark to cause ignition of the compressed first combustible mixture therein;
the step of generating a spark in the combustion chamber being carried out until the engine will run using auto-ignition of the second combustible mixture to ignite the first combustible mixture alone, thereafter ceasing the step of generating a spark.

The spark ignition system is only employed during those periods, such as start-up, when the operating conditions of the engine are such that operation with the torch-ignition system alone relying upon auto-ignition of the fuel mixture in the pre-combustion chamber would be inadequate for proper running of the engine. Constant operation of the engine using the spark ignition system would result in a high rate of wear and erosion of the electrodes of the spark plug. This would eventually result in poor engine performance and the need for frequent maintenance. Accordingly, it is most desirable that the use of the spark ignition system is kept to the minimum level necessary to achieve optimum engine performance.

The spark may be generated in the combustion chamber, causing direct ignition of the first combustible mixture. Alternatively, the spark may be generated in a spark-combustion chamber in communication with the combustion chamber. The spark-combustion chamber may be charged with a hydrocarbon fuel and oxygen to form a third combustible mixture of a hydrocarbon fuel, which is ignited at the appropriate time in the cycle of the engine. Alternatively, the spark-combustion chamber is filled with a portion of the first combustible mixture under the action of the compression stroke of the engine. Generation of a spark in the spark-combustion chamber ignites the combustible mixture in the spark-combustion chamber, which in turn causes the first combustible mixture in the combustion chamber to ignite. The use of a separate spark-combustion chamber in this manner can serve to protect the electrodes of the spark plug from high rates of wear.

In still a further aspect, the present invention provides an internal combustion engine comprising:

a combustion chamber defined by the inner wall of a cylinder, a cylinder head, and the upper surface of a piston moveable longitudinally within the cylinder, the combustion chamber having at least one inlet for the introduction into the combustion chamber of a first hydrocarbon fuel and oxygen and an outlet for exhaust gases;

a pre-combustion chamber having an inlet for the introduction into the pre-combustion chamber of a second hydrocarbon and a passageway in communication with the combustion chamber; and a spark generator operable, so as to generate a spark capable of causing ignition of the first combustible mixture within the combustion chamber.

The spark generator may be located so as to generate a spark directly in the combustion chamber, thereby directly igniting the first combustible mixture in the combustion chamber. Alternatively, the spark generator comprises an electrode, the electrode being located within a spark-combustion chamber, the spark-combustion chamber being in communication with the combustion chamber, whereby a spark-ignited combustible mixture in the spark-combustion chamber may enter the combustion chamber. The spark-combustion chamber may be provided with one or more inlets for a hydrocarbon fuel and oxygen to form a third combustible fuel mixture. Alternatively, the spark-combustion chamber may be arranged to as to be charged with a portion of the first combustible mixture from the combustion chamber, during the compression stroke of the engine.

In still a further aspect, the present invention includes the provision of a cylinder head, which may be used to modify existing torch-ignition engines by replacing the existing cylinder head, thereby allowing the engine to be operated, in particular started, using the methods of this invention. Accordingly, the present invention provides a cylinder head for an internal combustion engine, the cylinder head comprising:

a combustion chamber face, which face, when the cylinder head is mounted on an engine block of an engine, together with the inner walls of a cylinder and the upper surface of a piston moveable longitudinally within the cylinder, defines a combustion chamber;

a pre-combustion chamber, having an inlet for a hydrocarbon fuel;

a passageway having an opening in the pre-combustion chamber and extending from the pre-combustion chamber to an opening in the combustion face; and a receptor for a spark plug, the receptor being positioned so that the electrode of a spark plug located in the receptor is able to cause ignition of a combustible mixture present in the combustion chamber, when the cylinder head is mounted on an engine.

The cylinder head may have the receptor positioned so that the electrode of a spark plug located in the receptor is in direct contact with gases present in the combustion chamber, when the cylinder head is mounted on an engine. Alternatively, the cylinder head may comprise a spark-combustion chamber, the receptor being positioned so that the electrode of a spark plug located in the receptor extends into the spark-combustion chamber, the spark-combustion chamber being in communication with the combustion chamber when the cylinder head is mounted on an engine. The spark-combustion chamber may be provided with one or more inlets for a hydrocarbon fuel and oxygen. Alternatively, the spark-combustion chamber may be arranged so as to be charged with a portion of the first combustible mixture from the combustion chamber, during the compression stroke of the engine.

The first hydrocarbon fuel is preferably a gaseous hydrocarbon, that is a hydrocarbon that is normally gaseous under normal temperature and pressure. Natural gas is a most convenient fuel for use as the first hydrocarbon fuel.

The second hydrocarbon fuel may be any suitable fuel that is compressively ignitable, that is will ignite under compression during the compression stroke of the engine. This is in contrast to the first hydrocarbon fuel, which is one that, generally, will not ignite under compression alone and requires an ignition source, such as a spark or a torch-cell. The second hydrocarbon fuel is preferably a normally liquid hydrocarbon. A most suitable fuel for use as the second hydrocarbon fuel is diesel.

The method of the present invention may be applied to two cycle, as well as four cycle engines, with a four cycle engine being preferred.

BRIEF DESCRIPTION OF THE DRAWINGS

The present invention will be understood more fully from the detailed description given herein below and from the accompanying drawings of preferred embodiments of the invention. The description and drawings should not be taken to limit the invention to the specific embodiments, but are for explanation and understanding purposes only.

In the drawings.

DETAILED DESCRIPTION OF THE PREFERRED EMBODIMENT

Figure 1:
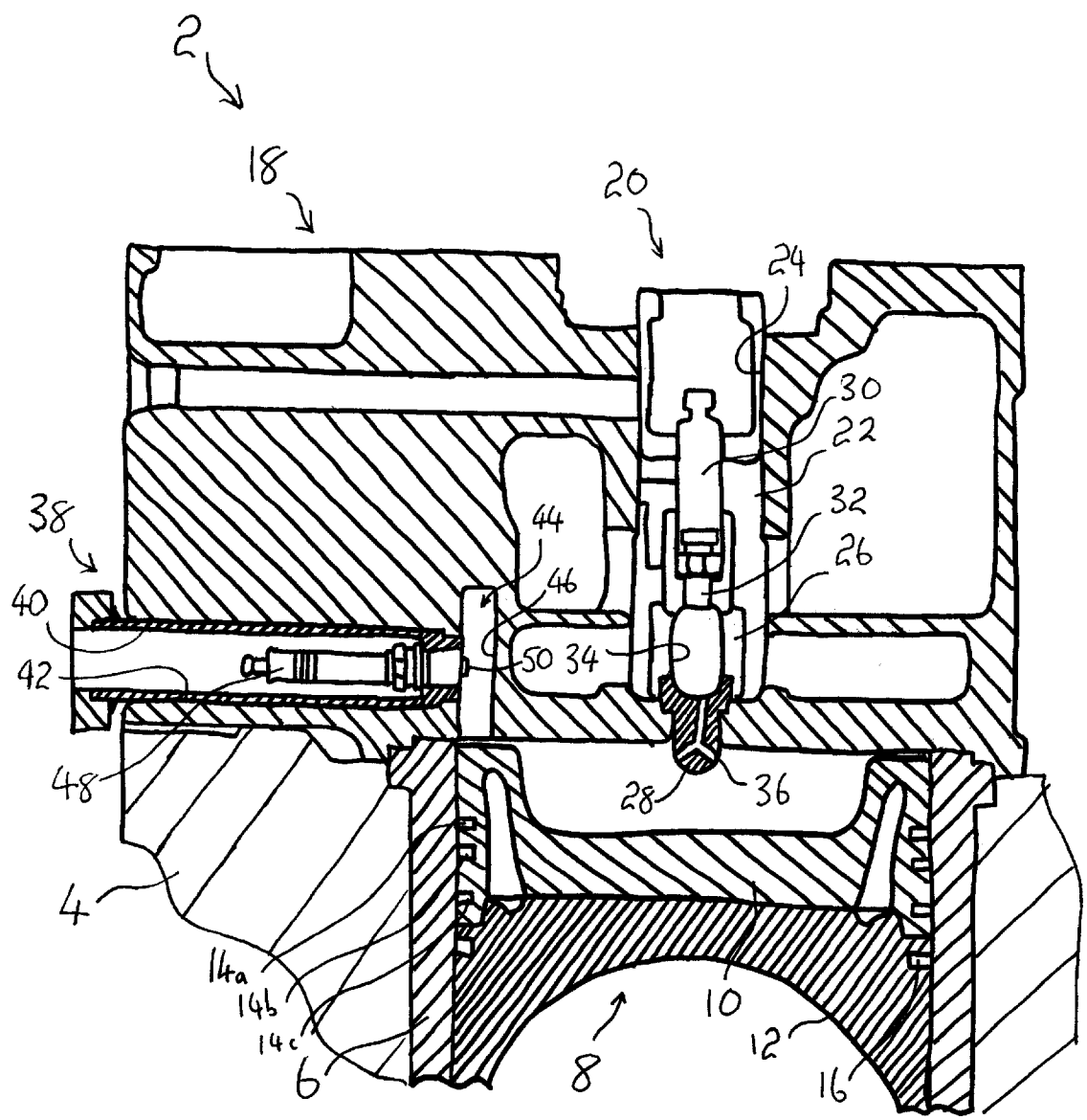
FIG. 1 is a cross-sectional representation of a portion of an engine according to the present invention, including a cylinder head according to the present invention.

Referring to FIG. 1, an internal combustion engine, generally represented as 2, comprises an engine block 4. The engine block 4 comprises a cylinder insert 6 located in a cylindrical bore in the engine block 4. The cylindrical inner wall of the cylinder insert 6 defines the cylindrical surface of a combustion chamber of the engine 2. A piston 8 is located within the cylinder and comprises a piston crown 10 and a piston body 12. The piston crown 10 is anchored to the piston body 12 by means bolts (not shown). The piston 8 is movable longitudinally within the cylinder under the action of a crank shaft (not shown), to which the piston is attached by a connecting rod (not shown). The piston crown 10 comprises three circumferential grooves in its outer surface, in which are located piston rings 14a, 14b and 14c. The piston body 12 comprises a similar groove, in which is located an oil ring 16. The piston rings 14a, 14b and 14c and oil ring 16 are of conventional design and bear against the inner wall of the cylinder insert 6 to provide a seal.

A cylinder head, generally represented as 18, is mounted on the engine block 4 so as to extend over the end of the cylinder insert 6. The combustion chamber of the engine is fully defined by the inner surface of the cylinder insert 6 (as mentioned above), the upper surface of the piston crown 10 and a portion of the lower surface of the cylinder head 18.

The cylinder head 18 comprises a torch-cell, generally indicated as 20, mounted in the cylinder head 18 so as to be in communication with the combustion chamber of the engine 2. The torch-cell 20 comprises a generally cylindrical torch-cell case 22 mounted in a cylindrical bore 24 in the cylinder head 18. A generally cylindrical pre-combustion chamber lining 26 is mounted co-axially within the torch-cell case 22. A torch-cell nozzle 28 extends from the end of the pre-combustion chamber lining 26 and projects from the surface of the cylinder head 18 defining the combustion chamber. A fuel injector 30 is mounted co-axially in the torch-cell case 22 at the opposite end of the pre-combustion chamber lining 26 to the torch-cell nozzle 28. The fuel injector 30 comprises a fuel injector nozzle 32 adjacent to and opening into a pre-combustion chamber 34 defined by the inner surface of the torch-cell case 22, the torch-cell nozzle 28 and the end of the fuel injector nozzle 32. The torch-cell nozzle 28 comprises an inverted Y-shaped channel 36, the stem of the Y opening into the pre-combustion chamber 34 and the two arms of the Y opening in the combustion chamber of the engine 2. Other arrangements for the torch-cell nozzle 28 comprising one or a plurality of channels may also be employed and are within the scope of the present invention.

The volume of the pre-combustion chamber is typically less than 10% of the volume of the combustion chamber, more preferably 5% or less of the combustion chamber. In order to lower engine emissions further, it is possible to operate the engine with the volume of the pre-combustion chamber being 2% or less of the combustion chamber, more preferably 1% or less of the combustion chamber.

In addition to the torch-cell 20, the cylinder head 18 comprises a spark plug receptor, generally indicated as 38. The spark plug receptor 38 comprises a cylindrical spark plug retainer 40 threaded into a cylindrical bore 42 extending into the cylinder head perpendicular to the cylindrical bore 24 retaining the torch-cell 20. A spark-combustion chamber 44 is formed by a cylindrical bore 46 extending from the portion of the surface of the cylinder head 18 defining the combustion chamber so as to communicate with the inner open end of the spark plug retainer 40. The cylindrical bore 46 is positioned in the cylinder head so as to open into the combustion chamber at its periphery adjacent the inner surface of the cylinder insert 6. A spark plug 48 is threaded into the spark plug retainer 40, with the electrode 50 of the spark plug extending into the spark-combustion chamber 44.

In normal operation, the engine relies upon the torch-cell as the sole source of ignition for the combustible fuel mixture in the combustion chamber. Thus, a hydrocarbon gas and air is introduced into the combustion chamber during the induction stroke of the engine to form a combustible mixture. At the same time, diesel is introduced into the pre-combustion chamber 34 in the torch-cell 20. Gas and air enter the pre-combustion chamber through the Y-shaped channel 36 in the torch-cell nozzle 28 from the combustion chamber. This results in the formation of a combustible mixture comprising diesel and air in the pre-combustion chamber 34. The action of the compression stroke of the engine compresses the fuel/air mixtures in both the combustion chamber and pre-combustion chamber, causing auto-ignition of the diesel/air mixture in the pre-combustion chamber 34. The thus ignited mixture in the pre-combustion chamber 34 expands, passes along the Y-shaped channel 36 in the torch-cell nozzle 28, and enters the combustion chamber. The ignited fuel mixture leaving the torch-cell nozzle 28 in turn ignites the gas/air mixture in the combustion chamber and provides the ignition or power stroke of the engine. An exhaust stroke follows, to complete the cycles of the engine.

Under certain operating conditions, it is not possible for the engine to maintain optimum performance by relying upon the torch-cell ignition alone. One example of such operating conditions can occur during start-up of the engine, in particular when the engine is cold. Under such conditions, the torch-cell ignition is supplemented by the use of the spark ignition system. In this case, the operation of the engine follows the procedure outlined above. During the normal operation of the engine, the combustible mixture of hydrocarbon gas and air enters the spark-combustion chamber 44 under the action of the compression stroke. When the spark ignition is required to supplement the torch-cell operation, a conventional ignition system (not shown in FIG. 1 for clarity), generates a spark across the electrode 50 of the spark plug 48 in the spark-combustion chamber at the appropriate moment during the cycles of the engine. This spark ignites the portion of the gas/air mixture in the spark-combustion chamber 44 and, in turn, the remaining gas/air mixture in the combustion chamber. The spark ignition system is used for as long as required to achieve or maintain optimal engine running.

It will be appreciated that the cylinder head 18 shown in FIG. 1 may be provided as a component of a complete engine assembly. However, it will also be appreciated that the cylinder head 18 can be provided as a separate component for the modification of existing, conventional torch-cell engines.

FIG. 1 shows a single cylinder of the engine 2. The engine may comprise a single or multiple cylinders, with the cylinder head for each cylinder being provided with both the torch-cell and spark ignition system. Further, FIG. 1 shows a single torch cell and a single spark plug for the cylinder illustrated. However, the engine may be provided with multiple torch cells and/or multiple spark plugs for each cylinder.

While the particular embodiments for the method and apparatus of the present invention as herein disclosed in detail are fully capable of obtaining the objects and advantages herein stated, it is to be understood that they are merely illustrative of the presently preferred embodiments of the invention and that no limitations are intended by the details of method of operation, details of construction or design herein shown other than as described in the appended claims.

I claim:

1. A method for operating an internal combustion engine, which engine comprises a combustion chamber defined by the inner wall of a cylinder, a cylinder head and the upper surface of a piston moveable longitudinally within the cylinder, the engine further comprising a pre-combustion chamber in communication with the combustion chamber, the method comprising:
   (a) supplying to the combustion chamber a first hydrocarbon fuel and oxygen to form a first combustible mixture;
   (b) supplying to the pre-combustion chamber a second hydrocarbon fuel and oxygen to form a second combustible mixture, said second combustible mixture being auto-ignitable; and
   (c) compressing the first and second combustible mixtures by moving the piston within the cylinder;
the method further comprising the step of:
   (d) generating a spark to cause ignition of the compressed first combustible mixture in the combustion chamber; the spark being generated in a spark-combustion chamber in communication with the combustion chamber, the spark igniting a combustible mixture consisting of a portion of the first combustible mixture supplied to the spark-combustion chamber from the combustion chamber.

2. The method of claim 1, wherein step (d) is employed during the start-up of the engine.

3. The method of claim 1, wherein the first hydrocarbon fuel is a normally gaseous hydrocarbon.

4. The method of claim 3, wherein the first hydrocarbon fuel is natural gas.

5. The method of claim 1, wherein the second hydrocarbon fuel is diesel.

6. An internal combustion engine comprising:
   a combustion chamber defined by the inner wall of a cylinder, a cylinder head, and the upper surface of a piston moveable longitudinally within the cylinder, the combustion chamber having at least one inlet for the introduction into the combustion chamber of a first hydrocarbon fuel and oxygen to form a first combustible mixture, and an outlet for exhaust gases;
   a pre-combustion chamber having an inlet for the introduction into the pre-combustion chamber of a second hydrocarbon fuel and a passageway in communication with the combustion chamber; and
   a spark generator operable, so as to generate a spark within a spark-combustion chamber capable of causing ignition of the first combustible mixture within the combustion chamber;
   the spark-combustion chamber being in communication with the combustion chamber, whereby, in operation, the spark ignites a combustible mixture in the spark-combustion chamber consisting of a portion of the first combustible mixture.

7. The internal combustion engine of claim 6, wherein the spark generator is operable during the start-up period of the engine.

8. The internal combustion engine of claim 6, wherein the first hydrocarbon fuel is a normally gaseous hydrocarbon.

9. The internal combustion engine of claim 8, wherein the first hydrocarbon fuel is natural gas.

10. The internal combustion engine of claim 6, wherein the second hydrocarbon fuel is diesel.

11. The internal combustion engine of claim 6, wherein the spark generator comprises an electrode, the electrode being located within a spark-combustion chamber, the spark-combustion chamber being in communication with the combustion chamber, whereby a spark-ignited combustible mixture in the spark-combustion chamber may enter the combustion chamber.

12. A method for starting an internal combustion engine, which engine comprises a combustion chamber defined by the inner wall of a cylinder, a cylinder head and the upper surface of a piston moveable longitudinally within the cylinder, the engine further comprising a pre-combustion chamber in communication with the combustion chamber, the method comprising:

(a) supplying to the combustion chamber a first hydrocarbon fuel and oxygen, to form a first combustible mixture;

(b) supplying to the pre-combustion chamber a second hydrocarbon fuel and oxygen to form a second combustible mixture, the second combustible mixture being auto-ignitable;

(c) compressing the first and second combustible mixtures by moving the piston within the cylinder; and (d) generating a spark to cause ignition of the compressed first combustible mixture therein;

the step of generating a spark being carried out until the engine will run using compressive ignition of the second combustible mixture to ignite the first combustible mixture alone, thereafter ceasing the step of generating a spark;

the spark being generated in a spark-combustion chamber in communication with the combustion chamber, the spark igniting a combustible mixture consisting of a portion of the first combustible mixture supplied to the spark-combustion chamber from the combustion chamber.

13. The method of claim 12, wherein the first hydrocarbon fuel is a normally gaseous hydrocarbon.

14. The method of claim 13, wherein the first hydrocarbon fuel is natural gas.

15. The method of claim 12, wherein the second hydrocarbon fuel is diesel.

16. A cylinder head for an internal combustion engine, the cylinder head comprising:

a combustion chamber face, which face, when the cylinder head is mounted on an engine block of an engine, together with the inner walls of a cylinder and the upper surface of a piston moveable longitudinally within the cylinder, defines a combustion chamber;

a pre-combustion chamber, having an inlet for a hydrocarbon fuel;

a passageway having an opening in the pre-combustion chamber and extending from the pre-combustion chamber to an opening in the combustion face; and a receptor for a spark plug, the receptor being positioned so that the electrode of a spark plug located in the receptor is able to cause ignition of a combustible mixture present in the combustion chamber, when the cylinder head is mounted on an engine;

the cylinder head further comprising a spark-combustion chamber, the receptor being positioned so that the electrode of a spark plug located in the receptor extends into the spark-combustion chamber, the spark-combustion chamber being in communication with the combustion chamber when the cylinder head is mounted on an engine wherein, in operation, a combustible mixture is provided in the spark-combustion chamber consisting of a combustible mixture supplied from the combustion chamber.

17. A method for starting an internal combustion engine, which engine comprises a combustion chamber defined by the inner wall of a cylinder, a cylinder head and the upper surface of a piston moveable longitudinally within the cylinder, the engine further comprising a pre-combustion chamber in communication with the combustion chamber, the method comprising:

(a) supplying to the combustion chamber natural gas and oxygen to form a first combustible mixture;

(b) supplying to the pre-combustion chamber diesel and oxygen to form a second combustible mixture, the second combustible mixture being auto-ignitable;

(c) compressing the first and second combustible mixtures by moving the piston within the cylinder; and (d) generating a spark causing the ignition of the compressed first combustible mixture in the combustion chamber;

the step of generating a spark being carried out until the engine will run using auto-ignition of the second combustible mixture to ignite the first combustible mixture alone, thereafter ceasing the step of generating a spark;

the spark being generated in a spark-combustion chamber in communication with the combustion chamber, the spark igniting a combustible mixture consisting of a portion of the first combustible mixture supplied to the spark-combustion chamber from the combustion chamber.

* * * * *